United States Patent [19]

Yamada

[11] 4,361,390
[45] Nov. 30, 1982

[54] FOCUS CONDITION INDICATING SYSTEM FOR USE IN A CAMERA

[75] Inventor: Seiji Yamada, Sakai, Japan

[73] Assignee: Minolta Camera Kabushiki Kaisha, Osaka, Japan

[21] Appl. No.: 227,978

[22] Filed: Jan. 23, 1981

[30] Foreign Application Priority Data

Jan. 28, 1980 [JP] Japan .............................. 55/9476[U]

[51] Int. Cl.³ .......................... G03B 3/00; G03B 13/18
[52] U.S. Cl. ..................................... 354/198; 354/25; 354/289
[58] Field of Search ................. 354/25, 31, 60 L, 289, 354/198; 355/56

[56] References Cited

U.S. PATENT DOCUMENTS 3,743,416  7/1973  Widmer et al. ........................ 355/56
4,251,145  2/1981  Cocron et al. ......................... 354/31
4,272,176  6/1981  Maitani et al. ....................... 354/289

Primary Examiner—Russell E. Adams
Attorney, Agent, or Firm—Wenderoth, Lind & Ponack

[57] ABSTRACT

A focus condition indicating system for use in a camera includes a control signal producer provided in association with an objective lens of the camera for producing a control signal when the objective lens moves past a proper focus position and a sound producer for producing a sound signal upon receipt of the control signal.

18 Claims, 9 Drawing Figures

FOCUS CONDITION INDICATING SYSTEM FOR USE IN A CAMERA

BACKGROUND OF THE INVENTION

The present invention relates to a focus condition indicating system for use in a camera for indicating an in-focused condition of an objective lens.

When taking a photograph, it is necessary to adjust the position of the focusing element or of the entire camera objective lens by shifting the element or the whole lens along its optical axis in a direction away from or towards a focal plane, i.e., a film surface, so as to properly focus the image of an object to be photographed on the film surface.

When the image, as viewed through the viewfinder, is found to be out of focus, it is difficult to tell at the very beginning of the adjustment to which direction should the lens be shifted, and it often takes a long period of time before the lens is shifted to the proper focus position.

In consideration of such an inconvenience, there has been proposed a visual indicator having a signal producing means for producing a signal that indicates the side on which the lens is located from its proper focus position, and a display means including a lamp or meter capable of showing in the field of a viewfinder the direction to which the lens should be shifted to bring the lens into the proper focus position. This type of indicator is disclosed in the Japanese Patent Application of Werner Holle, laid open to the public on Apr. 19, 1977 by laid-open publication No. 49027/1977 (this Japanese Patent application being based on German Patent application DT-AS No. 25 37 482 of Werner Holle).

When the above described visual indicator is employed, the photographer has to alternately change his sight between the image viewed through the viewfinder and the sign on the indicator during the lens adjustment, making the adjusting operation more difficult. Furthermore, the photographer may loose the decisive moment, as he has been occupied by the adjusting operation.

SUMMARY OF THE INVENTION

Accordingly, it is a primary object of the present invention to provide an indicator which indicates the focus condition of a camera objective, thus allowing the user to fix his sight on the object image in the viewfinder, and thereby enabling a quick focus adjustment.

It is a further object of the present invention to provide a focus condition indicating system for use in a camera for producing a sound when the objective lens of the camera is shifted to the proper focus position.

It is another object of the present invention to provide a focus condition indicating system of the above described type which is simple in construction and can readily be manufactured at a low cost.

To accomplish these and other objects, a focus condition indicating system for use in a camera according to the present invention comprises an in-focus signal producing means provided in association with an objective lens of the camera for producing an in-focus signal when the objective lens moves past a proper focus position and a sound producing means for producing a sound signal upon receipt of the in-focus signal.

BRIEF DESCRIPTION OF THE DRAWINGS

These and other objects and features of the present invention will become apparent from the following descriptions taken in conjunction with preferred embodiments thereof with reference to the accompanying drawings, throughout which like parts are designated by like reference numerals, and in which.

DETAILED DESCRIPTION OF THE PREFERRED EMBODIMENTS

Figure 1:
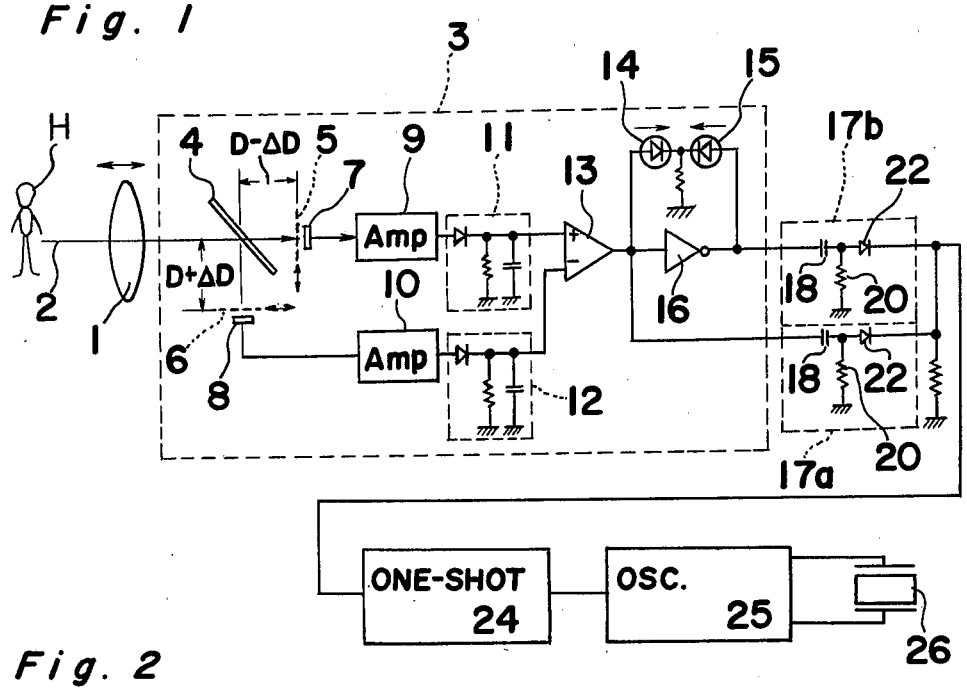
FIG. 1 is a circuit diagram of a focus condition indicating system provided in a camera according to the first embodiment of the present invention.

Referring to FIG. 1, a focus condition indicating system according to the present invention comprises a focus signal producing device 3 coupled operatively to the movement of an objective lens 1 of a camera. The objective lens 1, as diagrammatically shown in the form of a single concave lens, is mounted on a lens mount, coupled to a manipulatable focusing ring (not shown), for movement along its optical axis between a near focus position, where an image of a target object located at a minimum available distance away from the camera can be focused on an image forming plane where a light sensitive film is located, and an infinite focus position where an image of a target object located at a substantially infinite distance away from the camera can be focused on the film. It is apparent to those skilled in the art that the lens 1 normally comprises a plurality of lens elements and that a part of or all of the lens elements are moved for focusing. The focus signal producing device 3 includes a half-mirror 4 disposed on the optical axis 2 of the objective lens 1 and inclined at a predetermined angle, preferably 45°, relative to the axis 2, for separating the light ray from an object H into two directions: the first direction in alignment with the optical axis 2 and the second direction perpendicular to the optical axis 2. First and second field stops 5 and 6, each formed of a spatial filter, are provided in the paths of the separated light rays in the first and second directions, respectively, and lie perpendicularly with respect to the respective light rays. The first and second field stops 5 and 6 are located at respective positions spaced a distance of $D-\Delta D$ and $D+\Delta D$ from the ray splitting point on the half-mirror 4 in the corresponding first and second directions, wherein D represents the distance from the ray splitting point to the image forming plane or the focal plane, i.e the plane that is optically equivalent to the plane where a photographic film is to be located, and $\Delta D$ is an arbitrarily chosen constant.

Photoelectric cells 7 and 8 are coupled with field stops 5 and 6, respectively, in such a manner as to receive the light that has passed through the field stops 5 and 6. Since each of such field stops is formed of a spatial filter in a form of a lattice or reticle having a plurality of equally spaced opaque strips and is vibrated in a direction perpendicular to the strips, the respective photocell generates an AC signal having an amplitude that depends on the sharpness of the image formed on the corresponding field stop. The sensitivity of the lattice depends on the pitch of the adjoining strips formed thereon.

The AC signal from the photocells 7 and 8 are respectively applied to the amplifiers 9 and 10 and in turn, to rectifiers 11 and 12. When the lens 1 is displaced from the near focus position to the infinite focus position, or vice versa, via a best focus position P intermediate between the near and infinite focus positions, the rectifiers 11 and 12 generate respective output signals having the waveforms shown by curves V11 and V12 in FIG. 2 with respect to the lens movement. A comparator 13 has its non-inverting input connected to the output of the rectifier 11 and has its inverting input connected to the output of the rectifier 12 and produces a high level signal when the voltage V11 exceeds the voltage V12 and a low level signal when the voltage V12 exceeds the voltage V11. Furthermore, the comparator 13 produces an intermediate level signal of a level between the levels of the high and low level signals when the voltages V11 and V12 are of the same level. The output of the comparator 13 is connected to a first pulse generator 17a and also, through an inverter 16, to a second pulse generator 17b having the same structure as the first pulse generator 17a. The output of the comparator 13 is further connected to a light emitting diode 14 which is in turn connected to ground. The output of the inverter 16 is also connected to a light emitting diode 15 which is in turn connected to ground. In other words, the light emitting diodes 14 and 15 are connected to each other in opposite polarity across the inverter 16, with the node between the light emitting diodes being grounded. The light emitting diodes 14 and 15 are provided for illuminating arrow marks preferably provided so as to be viewable in a viewfinder field along its upper or lower edge. Each of the first and second pulse generators 17a and 17b includes a capacitor 18 and a resistor 20 forming a differentiating circuit and a diode 22 which allows only the positive going pulse to pass therethrough. The outputs of the first and second pulse generators 17a and 17b are connected to each other and are connected to a one-shot multivibrator 24 which is in turn connected to an oscillator 25 and further to a sound producer 26 formed by, e.g., a piezoelectric element.

Figure 2:
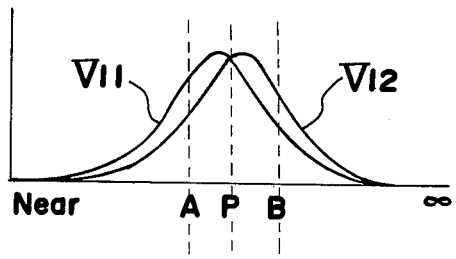
FIG. 2 is a graph showing waveforms of output signals obtained from major elements employed in the circuit of FIG. 1.

The operation of the focus condition indicating system of the above described embodiment is explained below with reference to the graph of FIG. 2.

When the lens 1 is at a position A which is offset from the position P towards the near focus position, the image of the object H which would be properly focused on the film surface when the lens 1 is at the position P is more sharply focused on the field stop 5 rather than on the field stop 6. Accordingly, the rectifier 11 produces a higher voltage than the output voltage V12 from the rectifier 12. Thus, the comparator 13 produces a high level signal. This high level signal actuates the light emitting diode 14 to generate light therefrom for illuminating the arrow mark informing the user that he should shift the lens 1 towards the infinite focus position to locate the lens 1 at a proper focus position. On the contrary, when the lens 1 is at a position B which is offset from the position P towards the infinite focus position, the image of the object H is more sharply focused on the field stop 6 rather than on the field stop 5. Accordingly, the rectifier 12 produces higher voltage than the output voltage V11 from the rectifier 11. Thus, the comparator 13 produces a low level signal. This low level signal is inverted to a high level signal by the inverter 16 and is used for actuating the light emitting diode 15 to generate light for illuminating the arrow mark informing the user that he should shift the lens 1 towards the near focus position to locate the lens at a proper focus position.

During the movement of the lens 1 from the near focus position towards the infinite focus position, the lens 1 passes through the position P. In such an event, the comparator 13 abruptly changes its output from high to low level signal as the lens 1 passes the position P. This abrupt change is detected by the differentiating circuit of the pulse generator 17a which accordingly produces a positive going pulse which is fed to the one-shot multivibrator 24. Thereupon, the one-shot multivibrator 24 generates a pulse having a predetermined pulse duration, e.g. 0.1 msec., for effecting the oscillator 25 to provide an oscillating signal to the sound producer 26 during said pulse duration. Accordingly, the sound producer 26 produces a sound signal that informs the user that the lens 1 has just passed the in-focus position P. Similarly, during the movement of the lens 1 from the infinite focus to near focus position, the lens 1 passes through the position P causing the abrupt change in the output of the comparator 13 from a low to a high level signal. This abrupt change is inverted from a high to a low level by the inverter 16 and is detected by the differentiating circuit of the pulse generator 17b which accordingly produces a positive going pulse which is fed to the one-shot multivibrator 24. Thereupon, the sound producer 26 produces a sound in the same manner as described above.

When the lens 1 is at the proper focus position P, the comparator 13 produces an intermediate level signal for actuating both of the light emitting diodes 14 and 15.

When in use, the user first aims the camera at the object H to be photographed. This can be done by merely pointing the camera towards the object or by viewing the object through the viewfinder. The user then rotates the focusing ring to shift the lens 1 until the sound producer 26 produces a sound. Thereafter, by turning the ring thereabout back and forth, as accompanied by a sound in each turn, the user can narrow the range of turning and can locate the lens 1 at the proper focus position. It is to be noted that the above operation can be done without paying any attention to the arrow marks in the viewfinder. Therefore, it is possible for the photographer to adjust the lens 1 to the proper focus position without his eye being absorbed by the arrows or even without looking through the viewfinder.

Figure 3:
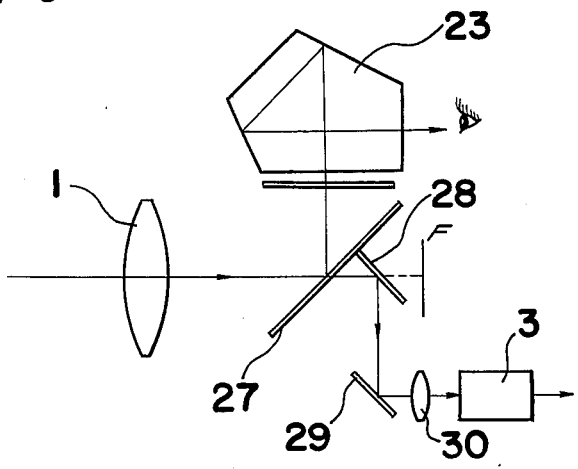
FIG. 3 is a schematic view showing the arrangement of the focus condition indicating system installed in the camera.

Referring to FIG. 3, there is shown one arrangement of the focus detecting optical system associated with a single lens reflex camera. A reflex mirror 27 made of a half mirror is provided for splitting the light ray from the lens 1 into two light beams, one directed towards a prism 23 and the other towards a reflex mirror 28. The light ray that has passed through the half mirror 27 is fully reflected by the reflex mirror 28, and further, by a reflex mirror 29, and is directed towards a relay lens 30. The relay lens 30 functions as an element equivalent to the objective lens 1. The focus signal producing device 3 is provided behind the relay lens 30 for effecting the above described operation, and the signal produced from the focus signal producing device 3 is processed in the above described manner to produce the sound signal indicative of the in-focus positioning of the objective lens 1.

Figure 4:
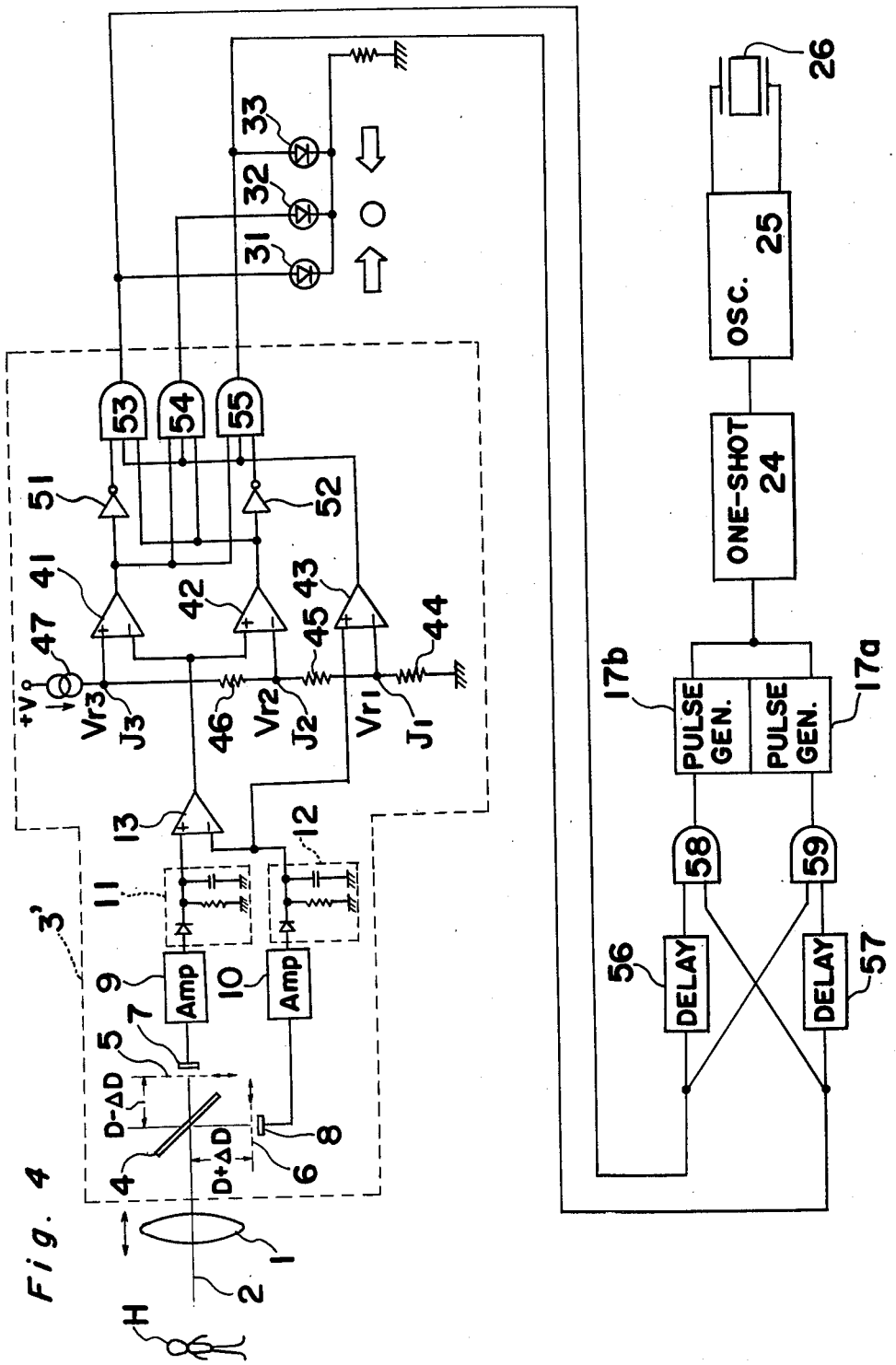
FIG. 4 is a circuit diagram according to the second embodiment of the present invention.

Referring to FIG. 4, there is shown a focus condition indicating system according to the second embodiment of the present invention. According to this embodiment, the focus signal producing device 3' has, instead of the inverter 16, three comparators 41, 42 and 43, two inverters 51 and 52, and three AND gates 53, 54 and 55. The output of the comparator 13 is connected to an inverting input of the comparator 41 and also to a non-inverting input of the comparator 42. The output of the rectifier 12 is connected to a non-inverting input of the comparator 43. A series circuit of resistors 44, 45 and 46 is connected between ground and a constant current source 47 for producing a predetermined reference voltage Vr1 at a junction J1 which is located between the resistors 44 and 45, a predetermined reference voltage Vr2 at a junction J2 which is located between the resistors 45 and 46, and a predetermined reference voltage Vr3 at a junction J3 which is located between the resistor 46 and the current source 47. The relationship of the voltages Vr1, Vr2 and Vr3 is $0 < Vr1 < Vr2 < Vr3$. The junctions J1, J2 and J3 are connected, respectively, to an inverting input of the comparator 43, an inverting input of the comparator 42 and a non-inverting input of the comparator 41. The output of the comparator 41 is connected directly to an input of AND gates 54 and 55 and also, through an inverter 51, to one input of AND gate 53. The output of the comparator 42 is connected directly to an input of AND gates 53 and 54 and also, through an inverter 52, to one input of AND gate 55. The output of the comparator 43 is connected directly to an input of AND gates 53, 54 and 55. The outputs of the AND gates 53, 54 and 55 are connected, respectively, to light emitting diodes 31, 32 and 33, which are in turn connected to ground. The light emitting diodes 31 and 33 are provided for illuminating arrow marks and the light emitting diode 32 is provided for illuminating a dot mark. These arrow and dot marks are preferably provided so as to be viewable in the viewfinder field. The output of the AND gate 53 is also connected to a delay circuit 56 and one input of an AND gate 59. Similarly, the output of the AND gate 55 is also connected to a delay circuit 57 and one input of an AND gate 58. The delay circuits 56 and 57 are connected, respectively, to AND gates 58 and 59 which are in turn connected to the pulse generators 17b and 17a, respectively. The outputs of the pulse generators 17a and 17b are connected to one-shot multivibrator 24, oscillator 25 and sound producer 26 in the same manner as that of the previous embodiment.

Figure 5A:
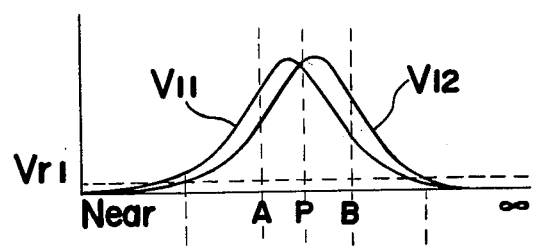
FIGS. 5a to 5d are graphs showing waveforms of output signals obtained from major elements employed in the circuit of FIG. 4.
Figure 5B:
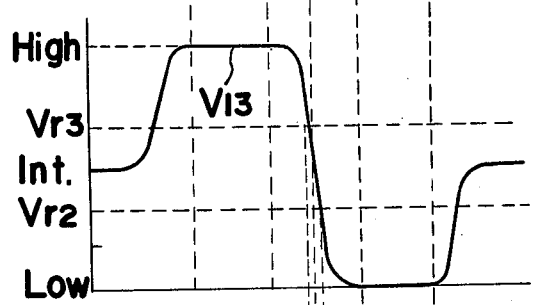

According to the focus condition indicating system of the second embodiment, the comparator 13 generates an output signal of waveform V13 shown in FIG. 5b in response to the waveforms V11 and V12 produced from the rectifiers 11 and 12. The reference voltage Vr2 is set between the low level and intermediate level, and the reference voltage Vr3 is set between the intermediate level and high level, as shown in FIG. 5b, and the reference voltage Vr1 is set slightly above the ground level, as shown in FIG. 5a. The operation of the focus condition indicating system of the second embodiment is explained below with reference to FIGS. 5a to 5d.

When the lens 1 is located at the near focus position, the comparator 13 produces the intermediate level signal, and the rectifier 12 produces the ground, or low, level signal. Accordingly, the comparators 41, 42 and 43 produce high, high and low level signals, respectively. Thus, in this case, the AND gate 53 receives a low level signal from the inverter 51, a low level signal from the comparator 43, and a high level signal from the comparator 42, and therefore, the AND gate 53 produces a low level signal. The AND gate 54 receives a high level signal from the comparator 41, a low level signal from the comparator 43 and a high level signal from the comparator 42, and therefore, produces a low level signal. Similarly, the AND gate 55 receives a high level signal from the comparator 41, a low level signal from the comparator 43 and a low level signal from the inverter 52, and therefore, produces a low level signal.

Figure 5C:
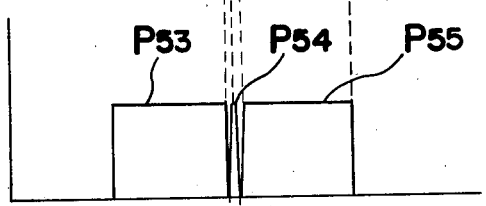
Figure 5D:
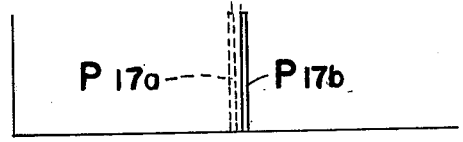

When the lens 1 is shifted from the near focus position to infinite focus position, the output signal V13 from the comparator 13 first gradually increases from the intermediate level to the high level. During this increasing output stage, the comparator 42 continues to produce a high level signal. Furthermore, during the same stage, the signal V13 exceeds the reference level Vr3 causing the comparator 41 to produce a low level signal. Accordingly, the AND gate 53 receives a high level signal from the inverter 51 and the AND gates 54 and 55 receives a low level signal from the comparator 41. Thereafter, when the output voltage V12 from the rectifier 12 exceeds the reference level Vr1, the comparator 43 produces a high level signal which is applied to each one of the AND gates 53, 54 and 55. Accordingly, the AND gate 53 produces a high level signal P53 (FIG. 5c).

Then, when the voltage V13 from the comparator 13 drops from high to low in response to the movement of the lens 1 past the in-focus position P, the voltage V13 first drops below the reference voltage Vr3 and then below the reference voltage Vr2. In response to the drop of the voltage V13 below the reference voltage Vr3, the comparator 41 produces a high level signal, and therefore, the AND gate 53 stops producing the high level signal, and at the same time, the AND gate 54 starts to produce a high level signal P54. Thereafter, in response to the drop of the voltage V13 below the reference voltage Vr2, the comparator 42 produces a low level signal, and therefore, the AND gate 54 stops producing the high level signal, and at the same time, the AND gate 55 starts to produce a high level signal P55.

A further shift of the lens towards the infinite focus position results in increase of voltage V13 from low to intermediate level and also in the decrease of voltage V12. When the voltage V12 drops below the reference voltage Vr1, the AND gate 55 receives a low level signal from the comparator 43 to stop producing the high level signal.

A similar operation is carried out when the lens 1 is shifted from the infinite focus position to the near focus position. Accordingly, by the shift of the lens 1 from near to infinite focus position, or vice versa, the AND gates 53, 54 and 55 produces pulses P53, P54 and P55, respectively, as shown in FIG. 5c.

When the AND gate 53 produces the pulse P53, the light emitting diode 31 is actuated so as to illuminate the arrow mark informing the user that he should shift the lens 1 towards the infinite focus position. Similarly, when the AND gate 55 produces the pulse P55, the lightemitting diode 33 is actuated in a similar manner to inform the user that he should shift the lens 1 towards the near focus position. When the AND gate 54 produces the pulse P54, the dot mark is illuminated informing the user that the lens 1 is in the proper focus position. The output from the AND gate 53 is further applied to the delay circuit 56 and the AND gate 59, and the output from the AND gate 55 is further applied to the delay circuit 57 and the AND gate 58.

During the movement of the lens 1 from near to infinite focus position, the AND gate 53 produces a high level signal which is applied to the delay circuit 56 and the AND gate 59. When the lens 1 then moves past the position P, the AND gate 55 produces a high level signal which is applied to the delay circuit 57 and the AND gate 58. At the time when the AND gate 55 produces a high level signal, the AND gate 58 receives a high level signal from the delay circuit 56 and from the AND gate 55. Accordingly, AND gate 58 produces a high level signal in response to the step-up of the pulse P55. The high level signal produced from the AND gate 58 is applied to the pulse generator 17b which thereupon generates a pulse (P17b in FIG. 5d) to actuate the one-shot multivibrator 24. Accordingly, the sound producer 26 produces a sound informing the user that the lens 1 has just moved past the proper focus position P.

In a similar manner, during the movement of the lens 1 from the infinite focus position to the near focus position, the AND gate 55 produces a high level signal which is applied to the delay circuit 57 and the AND gate 58. When the lens 1 then moves past the position P, the AND gate 53 produces a high level signal which is applied to the delay circuit 56 and the AND gate 59. In this case, the AND gate 59 produces a high level signal in response to the step-up of the pulse P53. The high level signal produced from the AND gate 59 is applied to the pulse generator 17a which thereupon generates a pulse (P17a in FIG. 5d) to actuate the one-shot multivibrator 24. Accordingly, the sound producer 26 produces a sound informing the user that the lens 1 has just moved past the proper focus position P.

Therefore, when in use, the photographer can locate the lens 1 at a proper focus position by turning the focusing ring back and forth while listening to two sounds and stopping the lens between the two sounds.

Figure 6:
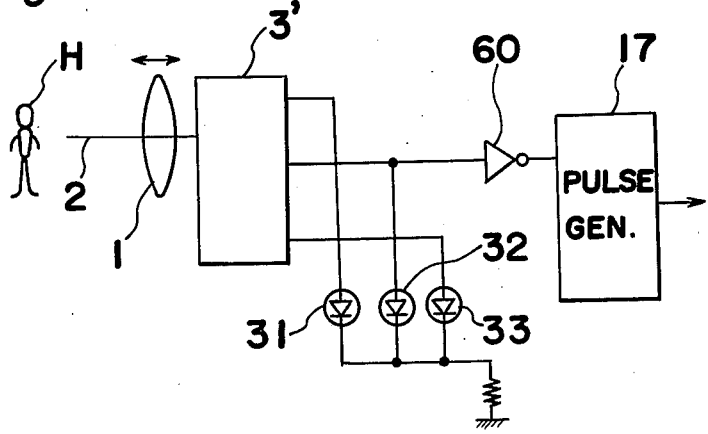
FIG. 6 is a schematic circuit diagram according to the third embodiment of the present invention.

Referring to FIG. 6, there is shown a focus condition indicating system according to the third embodiment of the present invention. According to this embodiment, the focus signal producing device 3' has the same structure as that described in the second embodiment. Instead of AND gates 53 and 55, the pulse generator 17 receives a signal only from the AND gate 54 through an inverter 60. Accordingly, the pulse generator 17 receives a high level signal from the inverter 60 during the movement of the lens 1 from its near focus position to its infinite focus position, or vice versa, except when the lens 1 moves past the proper focus position P. Therefore, the pulse generator 17 produces a pulse immediately after the lens moves past the proper focus position in the same manner as the second embodiment. Since the focus condition indicating system of the third embodiment operates in the same manner as the second embodiment, the description of its operation is omitted.

According to the present invention, it is possible to employ any other type of focus signal producing device 3 so long as it produces a signal when the lens 1 moves past a proper focus position.

Although the present invention has been fully described by way of examples with reference to the attached drawings, it is to be noted that various changes and modifications will be apparent to those skilled in the art. Therefore, it is contemplated that the appended claims will cover any such modifications or embodiments that fall within the true scope of the invention.

What is claimed is:

1. A focus condition indicating system for use in a camera comprising:
   an objective lens movable between a near focus position, where an image of a target object located a minimum available distance away from the camera can be focused on an image forming plane, and an infinite focus position, where an image of a target object located at a substantially infinite distance away from the camera can be focused on said image forming plane;
   control signal producing means for producing a control signal when said objective lens moves past a proper focus position; and
   sound producing means for producing a sound signal for a given short period of time upon receipt of said control signal.

2. A focus condition indicating system as claimed in claim 1, wherein said control signal producing means comprises means for producing a focus signal, said focus signal being on one side of a predetermined level when said objective lens is located between said near focus position and said proper focus position, and being on the other side of said predetermined level when said objective lens is located between said proper focus position and said infinite focus position.

3. A focus condition indicating system as claimed in claim 2, wherein said control signal producing means further comprises first means for producing an actuating signal when said focus signal is on said one side of the predetermined level, second means for producing an actuating signal when said focus signal is on said other side of the predetermined level, and third means coupled to said first and second means for producing said control signal in response to the production of said actuating signal from either one of said first and second means.

4. A focus condition indicating system as claimed in claim 2, wherein said focus signal is a high level signal above said predetermined level when said objective lens is located offset from said proper focus position and between said near focus position and said proper focus position, said focus signal gradually decreased to said predetermined level as the objective lens moves closer to said proper focus position from said near focus position, and said focus signal is a low level signal below said predetermined level when said objective lens is located offset from said proper focus position and between said infinite focus position and said proper focus position, said focus signal gradually increased to said predetermined level as the objective lens moves closer to said proper focus position from said infinite focus position.

5. A focus condition indicating system as claimed in claim 4, wherein said control signal producing means further comprises fourth means for producing an actuating signal when said focus signal exceeds a first reference level set between said predetermined level and said high level, fifth means for producing an actuating signal when said focus signal decreases below a second reference level set between said predetermined level and said low level, and sixth means for producing an actuating signal when said focus signal falls between said first and second reference levels.

6. A focus condition indicating system as claimed in claim 5, wherein said control signal producing means further comprises seventh means coupled to said fourth and fifth means for producing said control signal in response to the production of said actuating signal from either one of said fourth and fifth means.

7. A focus condition indicating system as claimed in claim 5, wherein said control signal producing means further comprises eighth means coupled to said sixth means for producing said control signal in response to the disappearance of said actuating signal from said sixth means.

8. A focus condition indicating system as claimed in claim 1, wherein said sound producing means comprises means for producing a pulse having a predetermined pulse duration in response to said control signal, an oscillator for producing an oscillating signal during said pulse duration and a sound generator coupled to said oscillator for generating a sound in accordance with said oscillating signal.

9. A focus condition indicating system as claimed in claim 3, further comprising first and second display means coupled to said first and second means, respectively, said first display means being actuated upon receipt of said actuating signal from said first means for the indication of an objective lens shift towards its infinite focus position so as to move said objective lens to said proper focus position, and said second display means being actuated upon receipt of said actuating signal from said second means for the indication of an objective lens shift towards its near focus position so as to move said objective lens to said proper focus position.

10. A focus condition indicating system as claimed in claim 9, wherein each of said first and second means further produces a quasi-actuating signal when said focus signal is equal to said predetermined level, said first and second display means being actuated at the same time upon receipt of said quasi-actuating signals from said first and second means for the indication of the movement of said objective lens to said proper focus position.

11. A focus condition indicating system as claimed in claim 5, further comprising third, fourth and fifth display means coupled to said fourth, fifth and sixth means, respectively, said third display means being actuated upon receipt of said actuating signal from said fourth means for the indication of an objective lens shift towards its infinite focus position so as to move said objective lens to said proper focus position, said fourth display means being actuated upon receipt of said actuating signal from said fifth means for the indication of an objective lens shift towards its near focus position so as to move said objective lens to said proper focus position, and said fifth display means being actuated upon receipt of said actuating signal from said sixth means for the indication of the movement of said objective lens to said proper focus position.

12. A focus condition indicating system as claimed in claim 9, wherein said first and second display means are viewable through a viewfinder of said camera.

13. A focus condition indicating system as claimed in claim 11, wherein said third, fourth and fifth display means are viewable through a viewfinder of said camera.

14. A focus condition indicating system as claimed in claim 1, further comprising a half mirror provided behind a reflex mirror employed in said camera, said half mirror adapted for splitting light rays directed towards film surface, a relay lens provided in a path of splitted light rays for applying light rays to said control signal producing means.

15. A focus condition indicating system for a camera comprising:
   a camera objective lens including a movable member which is movable for effecting a focus adjustment of the objective lens;
   a first signal means for generating a focus signal which varies in dependence upon the position of said movable member relative to an in-focus position thereof wherein said camera objective lens is focused on a desired object;
   a second signal means for generating a control signal in response to the variation of said focus signal at a time when said movable element passes said in-focus position;
   a sound producing means for producing an audible indication; and
   means for actuating said sound producing means for a given short period of time in response to said control signal.

16. A focus condition indicating system as claimed in claim 15, wherein said first signal means includes a photoelectric means for detecting the condition of the image formed by said camera objective lens at the focal plane thereof.

17. A focus condition indicating system as claimed in claim 16, wherein said first signal means includes a first means for generating a first signal while said movable member is on one side of said in-focus position thereof and a second means for generating a second signal while said movable member is on the other side of said in-focus position, and said second signal means includes means for generating said control signal in response to the disappearance of either one of said first and second signals.

18. A focus condition indicating system as claimed in claim 16, wherein said first signal means includes a third means for generating a third signal when said movable member is at said in-focus position, and said second signal means includes means for generating said control signal in response to the disappearance of said third signal.

* * * * *